US011867493B2

United States Patent
Day et al.

(10) Patent No.: US 11,867,493 B2
(45) Date of Patent: Jan. 9, 2024

(54) WIRELESS DETONATION SYSTEM

(71) Applicant: VOYAGER INNOVATIONS PTY LTD, Stones Corner (AU)

(72) Inventors: Nicholas Peter Day, Stones Corner (AU); Jeffrey Paul Owen, Stones Corner (AU)

(73) Assignee: VOYAGER INNOVATIONS PTY LTD, Stones Corner (AU)

( * ) Notice: Subject to any disclaimer, the term of this patent is extended or adjusted under 35 U.S.C. 154(b) by 180 days.

(21) Appl. No.: 17/436,552

(22) PCT Filed: Mar. 4, 2020

(86) PCT No.: PCT/AU2020/050200
§ 371 (c)(1),
(2) Date: Sep. 3, 2021

(87) PCT Pub. No.: WO2020/176939
PCT Pub. Date: Sep. 10, 2020

(65) Prior Publication Data
US 2022/0205769 A1 Jun. 30, 2022

(30) Foreign Application Priority Data
Mar. 4, 2019 (AU) ................................ 2019900706

(51) Int. Cl.
*F42D 1/055* (2006.01)
*H04W 4/80* (2018.01)

(52) U.S. Cl.
CPC ............... *F42D 1/055* (2013.01); *H04W 4/80* (2018.02)

(58) Field of Classification Search
CPC ............. F42D 1/05; F42D 1/005; H04W 4/80
See application file for complete search history.

(56) References Cited

U.S. PATENT DOCUMENTS 5,090,321 A * 2/1992 Abouav ................. F42C 15/40
102/202.1
6,014,932 A * 1/2000 Mardirossian .......... F42C 15/40
102/401
(Continued)

FOREIGN PATENT DOCUMENTS

CN  101349532 A  1/2009
CN  101813443 A  8/2010
(Continued)

OTHER PUBLICATIONS

Transmittal of the International Search Report and Written Opinion of the International Searching Authority dated Jun. 3, 2020, for International Application No. PCT/AU2020/050200, filed Mar. 4, 2019, pp. 11.
(Continued)

*Primary Examiner* — Joshua E Freeman
(74) *Attorney, Agent, or Firm* — WOMBLE BOND DICKINSON (US) LLP

(57) ABSTRACT

A wireless detonation system having a dongle for removable connection with a computer system and for wirelessly communicating with and controlling one or more trigger devices and a trigger device for wirelessly communicating with the dongle. The dongle includes a dongle processor programmed to communicate with the computer system via the communication interface to operate the radio transceiver to wirelessly communicate with one or more trigger devices, a radio transceiver coupled to the dongle processor, a communication interface coupled to the dongle processor and one or more contact communication terminals in communication with the dongle processor. The trigger device includes a trigger device processor programmed to communicate with the dongle, a radio transceiver in communication with the trigger device processor, one or more contact communication terminals in communication with the trigger (Continued)

device processor, and an electric energy storage unit under control of the trigger device processor and adapted to store electrical energy for igniting a detonator. The dongle processor is further programmed to receive one or more commands from the connected computer system and transmit the one or more commands to the trigger device and wherein the trigger device processor is further programmed to, in response to the commands from the dongle, ignite a detonator and the trigger device is adapted to only accept commands from the dongle.

20 Claims, 7 Drawing Sheets

(56) References Cited

U.S. PATENT DOCUMENTS

| | | | | |
|---|---|---|---|---|
| 6,101,916 | A * | 8/2000 | Panot | F41H 11/12 89/1.13 |
| 6,247,408 | B1 * | 6/2001 | Andrejkovies | F42D 1/045 102/268 |
| 6,851,369 | B2 * | 2/2005 | Hummel | F42D 1/05 102/221 |
| 7,021,216 | B1 * | 4/2006 | Dragne | F42D 1/05 102/206 |
| 7,791,858 | B2 * | 9/2010 | Hummel | F42D 1/05 361/247 |
| 7,810,430 | B2 * | 10/2010 | Chan | F42B 3/121 102/214 |
| 8,474,379 | B2 * | 7/2013 | Jacobson | F42D 3/04 102/311 |
| 9,091,518 | B2 * | 7/2015 | Lownds | F42D 1/045 |
| 9,354,029 | B2 * | 5/2016 | Mace | E21B 47/135 |
| 10,260,846 | B1 * | 4/2019 | Fish | F41A 19/58 |
| 11,002,520 | B2 * | 5/2021 | Wu | F42C 17/00 |
| 2005/0000382 | A1 * | 1/2005 | Hummel | F42D 5/00 102/221 |
| 2018/0066927 | A1 * | 3/2018 | Wu | F42C 17/00 |
| 2021/0010789 | A1 * | 1/2021 | Wu | F42C 17/00 |

FOREIGN PATENT DOCUMENTS

| | | |
|---|---|---|
| WO | 2005052498 A1 | 6/2005 |
| WO | 2012061850 A1 | 5/2012 |

OTHER PUBLICATIONS

Machine translation of Office Action for Chinese Patent Application No. 202080019150.0 dated Feb. 7, 2023.

* cited by examiner

WIRELESS DETONATION SYSTEM

CROSS-REFERENCE TO RELATED APPLICATION

This patent application is a U.S. National Phase Application under 35 U.S.C. § 371 of International Application No. PCT/AU2020/050200, filed 4 Mar. 2020, which claims the benefit of Australia Patent Application No.: 2019900706, filed 4 Mar. 2019, which are hereby incorporated by reference in its entirety.

FIELD OF THE INVENTION

The present invention relates to a wireless detonation system configured to allow blast sites to be set up with accurate delays and to prevent misfiring or unintended detonations.

BACKGROUND

Any references to methods, apparatus or documents of the prior art are not to be taken as constituting any evidence or admission that they formed, or form, part of the common general knowledge.

There are a number of existing techniques currently in use in the mining and blasting industries. Some of these techniques include blasting methods involving drilling blast holes in a blasting face, locating charges or explosives within the blast holes and initiating the blasting of the charges or explosives remotely by means of a detonator which is triggered either over conducting wires or wirelessly.

Unfortunately, in some instances, the charges may be accidentally detonated through unintentional activation of the remote detonator initiator or by a faulty detonator associated with one or more of the charges.

With these safety considerations in mind, one attempt at a solution to the above problems involves the use of a detonator, fuse, primer and explosive. Typically, the detonator is triggered using energised electrical cables. Activation of the detonator causes the fuse to be blown which ultimately initiates the primer. As the primer ignites, the charge will explode. The long chain of firing components are intended to ensure no inadvertent firing occurs.

However, these prior art detonation systems suffer from the need to wire detonators together and then connect the entire array to a remote initiator. This setup is often difficult, labour intensive, expensive and time consuming.

In view of the above, it is desirable to provide an improved detonation system.

OBJECT OF THE INVENTION

It is an aim of this invention to provide a detonation system which overcomes or ameliorates one or more of the disadvantages or problems described above, or which at least provides a useful commercial alternative.

Other preferred objects of the present invention will become apparent from the following description.

SUMMARY OF THE INVENTION

In one form, although it need not be the only or indeed the broadest form, there is provided a wireless detonation system comprising:
a dongle for removable connection with a computer system and for wirelessly communicating with and controlling one or more trigger devices, the dongle comprising:
a dongle processor programmed to communicate with the computer system via the communication interface to operate the radio transceiver to wirelessly communicate with one or more trigger devices;
a radio transceiver coupled to the dongle processor;
a communication interface coupled to the dongle processor; and
one or more contact communication terminals in communication with the dongle processor; and
a trigger device for wirelessly communicating with the dongle, the trigger device comprising:
a trigger device processor programmed to communicate with the dongle;
a radio transceiver in communication with the trigger device processor;
one or more contact communication terminals in communication with the trigger device processor; and
an electric energy storage unit under control of the trigger device processor and adapted to store electrical energy for igniting a detonator,
wherein the dongle processor is further programmed to receive one or more commands from the connected computer system and transmit the one or more commands to the trigger device and wherein the trigger device processor is further programmed to, in response to the commands from the dongle, ignite a detonator, and
wherein the trigger device is adapted to only accept commands from the dongle.

Preferably, the one or more contact communication terminals of the dongle comprise one or more electrodes. Preferably, the one or more contact communication terminals of the trigger device comprise one or more electrodes. Preferably, the dongle is programmed to transmit a unique dongle identifier to the trigger device in response to the one or more contact communication terminals of the dongle physically contacting the one or more contact communication terminals of the trigger device. Preferably, in response to the one or more contact communication terminals of the dongle physically contacting the one or more contact communication terminals of the trigger device, the trigger device is programmed to transmit a unique trigger device identifier to the dongle. Preferably, in response to the one or more contact communication terminals of the dongle physically contacting the one or more contact communication terminals of the trigger device, the trigger device is synchronised to the dongle and is adapted to only accept commands from the dongle.

Preferably, the system further comprises a detonator connected to the trigger device and configured to be activated or ignited by the electric energy storage unit. Preferably, the detonator is connected to an explosive charge.

Preferably, the system comprises one or more trigger devices. Preferably, each trigger device is connected to a detonator.

Preferably, the dongle further comprises a database stored on the dongle in communication with the dongle processor. Preferably, the database stores unique identifiers associated with trigger devices. Preferably, the dongle processor comprises a central processing unit and a USB controller.

Preferably, the dongle processor has a unique identifier stored thereon, wherein the unique identifier is associated with the dongle.

Preferably, the trigger device processor of the trigger device comprises a central processing unit. Preferably, the trigger device processor has a unique identifier associated with the trigger device stored thereon.

Preferably, each of the trigger device and the dongle comprise a battery.

Preferably, each battery is rechargeable. Alternatively, each battery is non-rechargeable.

Preferably, the communication interface comprises a Universal Serial Bus (USB) connection.

Preferably, the electric energy storage unit comprises a capacitor.

Preferably, the dongle further comprises one or more annunciators for providing visual and/or haptic feedback. Preferably, the annunciators are at least one of a vibration motor, a light emitting diode, a buzzer, or a speaker. Preferably, each annunciator is in communication with and is controlled by the dongle processor.

Preferably, the trigger device further comprises one or more annunciators for providing visual and/or haptic feedback. Preferably, the annunciators are at least one of a vibration motor, a light emitting diode, a buzzer, or a speaker. Preferably, each annunciator is in communication with and is controlled by the trigger device processor.

Preferably, the system further comprises a computer system having a software application installed thereon adapted to control the dongle and the trigger device. Preferably, the computer system is located remotely from the trigger device located around the blast site.

Preferably, the computer system is programmed to communicate with the dongle and the trigger device. Preferably, the computer system is programmed to communicate with the trigger device via the dongle, wherein the dongle is a conduit between the trigger device and the computer system.

In another aspect, the invention resides in a method for controlling detonation of one or more explosive charges, the method comprising the steps of:
  wirelessly associating one or more trigger devices with a dongle, wherein each trigger device is connected to a detonator connected to an explosive charge;
  connecting the dongle to a computer system having a control application installed thereon;
  transmitting a first command generated by the control application from the dongle to the trigger device to arm the trigger device; and
  transmitting a second command generated by the control application from the dongle to the trigger device to detonate the explosive charge, wherein each trigger device is adapted to only accept commands from the dongle.

Preferably, the method further comprises the steps of:
  drilling a blast hole in a blasting face; and
  locating a trigger device connected to a detonator and an explosive charge within the blast hole.

Preferably, the method further comprises the step of instructing the dongle via the computer system to transmit a first command to the trigger device to arm the trigger device.

Preferably, the method further comprises the step of instructing the dongle via the computer system to transit a second command to the trigger device to detonate the explosive charge, wherein an electric charge is released from the trigger device to the detonator.

Preferably, the method further comprises the step of charging an electric energy storage unit of the trigger device in response to receiving the first command to arm the trigger device. Preferably, the electric energy storage unit is connected to the detonator.

Preferably, the method further comprises the step of discharging the electric energy storage unit to ignite the detonator in response to receiving the second command to detonate the explosive charge.

Preferably, the method further comprises the step of transmitting a third command from the dongle to the trigger device to evaluate the trigger device. Preferably, the third command is transmitted before and/or after the first command and before the second command. Preferably, the step of discharging the electric energy storage unit cannot be actioned until the third command has been received. Preferably, the step of arming the trigger device cannot be actioned until the third command has been received.

Preferably, the method further comprises the step of evaluating one or more conditions of the trigger device. Preferably, the evaluation comprises evaluating the electrical connection between the electric energy storage unit and the detonator of the trigger device. Preferably, the evaluation is performed by a processor of the trigger device.

Preferably, the method further comprises the step of instructing the dongle via the computer system to transit a third command to the trigger device to evaluate one or more conditions of the trigger device.

Preferably, the method further comprises the step of physically contacting one or more contact communication terminals of the dongle with one or more contact communication terminals of each of the one or more trigger devices to thereby wirelessly associate the dongle with each of the one or more trigger devices.

In another form, although it need not be the only or indeed the broadest form, there is provided a wireless detonation system comprising:
  a dongle for removable connection with a computer system and for wirelessly communicating with and controlling one or more trigger devices, the dongle comprising:
    a dongle processor programmed to communicate with the computer system via the communication interface to operate the radio transceiver to wirelessly communicate with one or more trigger devices;
    a radio transceiver coupled to the dongle processor;
    a communication interface coupled to the dongle processor; and
    one or more communication terminals in communication with the dongle processor; and
  a trigger device for wirelessly communicating with the dongle, the trigger device comprising:
    a trigger device processor programmed to communicate with the dongle
    a radio transceiver in communication with the trigger device processor;
    one or more communication terminals in communication with the trigger device processor; and
    an electric energy storage unit under control of the trigger device processor and adapted to store electrical energy for igniting a detonator,
  wherein the dongle processor is further programmed to receive one or more commands from the connected computer system and transmit the one or more commands to the trigger device and wherein the trigger device processor is further programmed to, in response to the commands from the dongle, ignite a detonator, and wherein the trigger device is adapted to only accept commands from the dongle.

Preferably, the one or more communication terminals of the dongle comprise one or more contact communication terminals or one or more close proximity communication terminals. Preferably, the one or more communication terminals of the trigger device comprise one or more contact communication terminals or one or more close proximity (or contactless) communication terminals.

Preferably, the close proximity communication terminals of the trigger and the dongle comprise a Near Field Communication (NFC) terminal or Radio Frequency Identifier (RFID) terminal.

Further features and advantages of the present invention will become apparent from the following detailed description.

BRIEF DESCRIPTION OF THE DRAWINGS

By way of example only, preferred embodiments of the invention will be described more fully hereinafter.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF THE PREFERRED EMBODIMENTS

Figure 1:
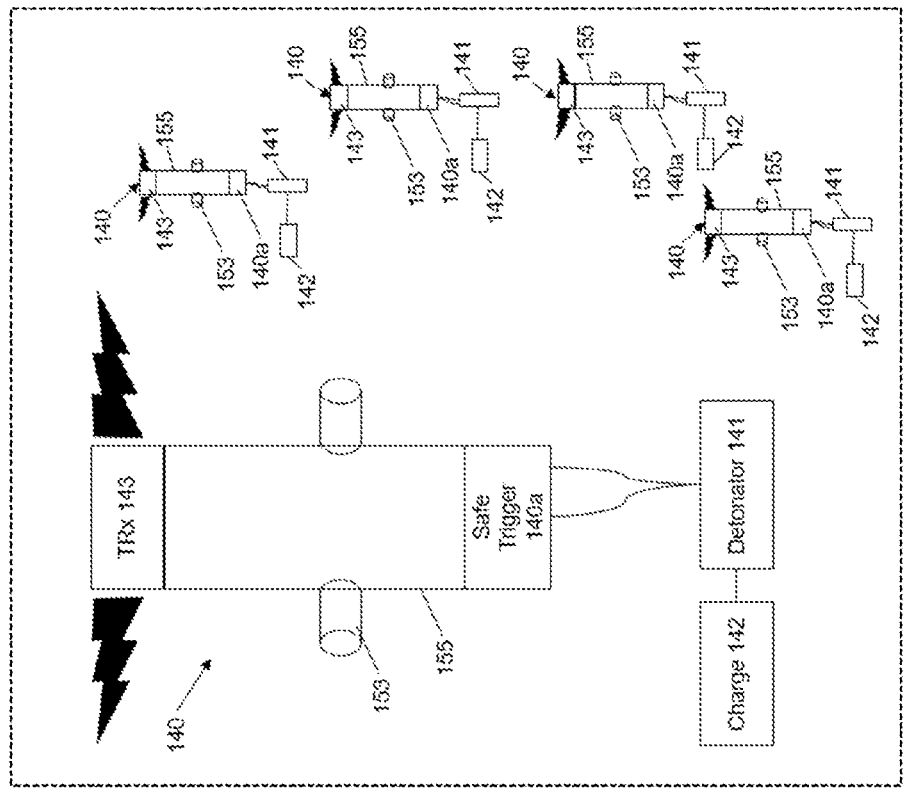
FIG. 1 is a schematic of a wireless detonation system according to a first embodiment of the present invention.
Figure 1:
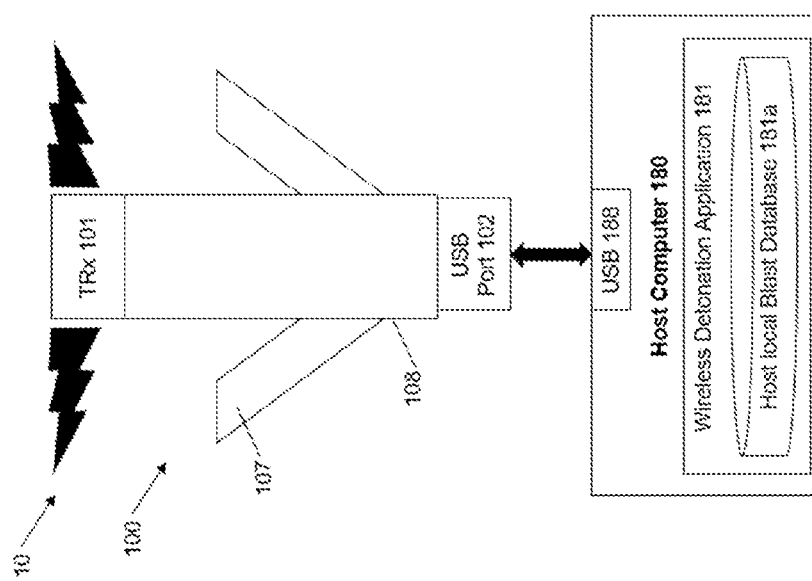

FIG. 1 illustrates a schematic diagram of a wireless detonation system 10 according to an embodiment of the present invention. The wireless detonation system 10 includes a dongle 100, a plurality of trigger devices 140 and a host computer 180.

The dongle 100, which plugs into and interfaces with the host computer 160, has wireless capabilities that also allow it to interface with multiple trigger devices.

The trigger device 140, of which there will typically be many on a blast site (as shown in FIG. 1), each connect to a detonator 141 and wirelessly interface with the dongle 100.

Finally, the host computer 180, which hosts a host application 181 installed thereon is used by a blast operator to affect and coordinate detonation of the charges 142 attached to the trigger devices 140 located on the blast site.

Figure 2:
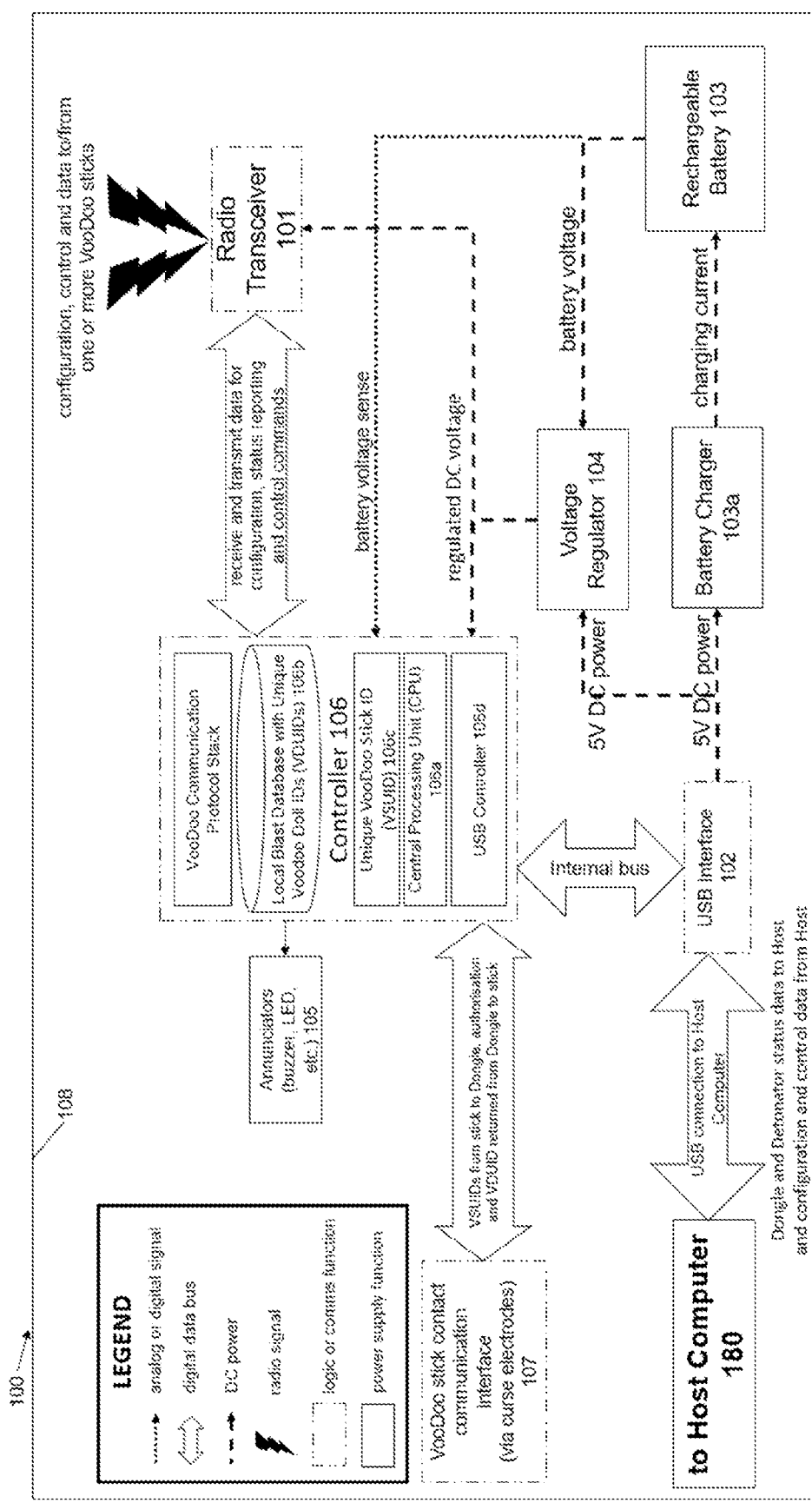
FIG. 2 illustrates a block diagram of a dongle of the system of FIG. 1 according to an embodiment of the present invention.

A function block diagram of the dongle 100 is shown in FIG. 2. The dongle 100 includes a dongle controller 106 which is in data communication with a wireless radio transceiver 101, a communication interface in the form of a USB port 102, annunciators 105 for providing visual, audio and haptic feedback, and a contact communication terminal in the form of a pair of electrodes 107. The communication interface may take any suitable form that allows the dongle 100 to be physically connected to a host computer or computing device. Similarly, the contact communication terminal may be substituted with a contactless or close-proximity communication terminal, such as a Near Field Communication (NFC) terminal or Radio Frequency Identifier (RFID) terminal, for example.

Power is provided by a battery 103 (which is preferably rechargeable but could be non-rechargeable in some embodiments) having a battery charger 103a and a voltage regulator 104 which is a part of an internal power supply. Each of the above components is located within a housing 108.

The radio transceiver 101 provides wireless communication with the trigger devices 140 for the purposes of discovery, configuration and control of the trigger device 140.

The USB port 102 of the dongle 100 connects the dongle 100 to a host computer 180. The host computer 180 is then able to communicate with dongle controller 106 and thence facilitates control of the trigger devices 140 such that commands can be issued from the host application 181 running on the host computer 180 through the dongle 100 to the trigger devices 140.

Connection of the USB port 102 to the host computer 180 recharges the rechargeable battery 103 to allow the dongle 100 to operate even when removed from the host computer 180 (e.g. when registering trigger devices 140 with the dongle 100, as will be explained).

As mentioned, the internal battery 103 is connected to and provides power to the radio transceiver 101, the dongle controller 106 and the electrodes 107. When connected to the computer system 180 (or any other system or device having a USB port), power is provided via the USB port 102 from the connected device to recharge the battery 103.

The dongle controller 106 is programmed to operate the annunciators 105 to confirm particular events or states (e.g. successful trigger device registration to the dongle 100 via the electrodes 107) through an aural and/or audio feedback. The annunciators 105 may take the form of any appropriate aural, visual and/or haptic feedback device, such as a buzzer and/or light emitting diode and/or vibration motor, for example.

The dongle controller 106 manages all functions and controls state flow of the dongle through a central processing unit 106a. As can be seen in FIG. 2, the dongle controller 106 also includes a local blast database 106b comprising local memory having unique dongle identifiers stored thereon (referred to herein as Voodoo Doll Unique IDs—VDUIDs), a globally unique identifier (referred to herein as a Voodoo Stick Unique ID—VSUID 106c) which provides unambiguous identification of the dongle 100 by the host application 181 located on a host computer 180 and maintaining a secure communication link with registered trigger devices 140. The dongle controller 106 also includes a USB controller 106d for controlling the USB connector 102.

Finally, the contact electrodes 107 facilitate contact communication with trigger devices 140 (also having contact electrodes 153) for registration and authorisation (i.e. pairing or associating) to the dongle 100.

Once a dongle 100 is assigned to a blast it must be used for all operations unless the operator manually elects to unauthorise (or de-authorise) the dongle 100 and thus use another dongle (which is substantially similar to dongle 100). This exclusive association between the blast being set-up, a specific dongle, and associated, registered trigger devices, is an important safety feature that prevents unintended detonation of the charges at the blast site.

Figure 3:
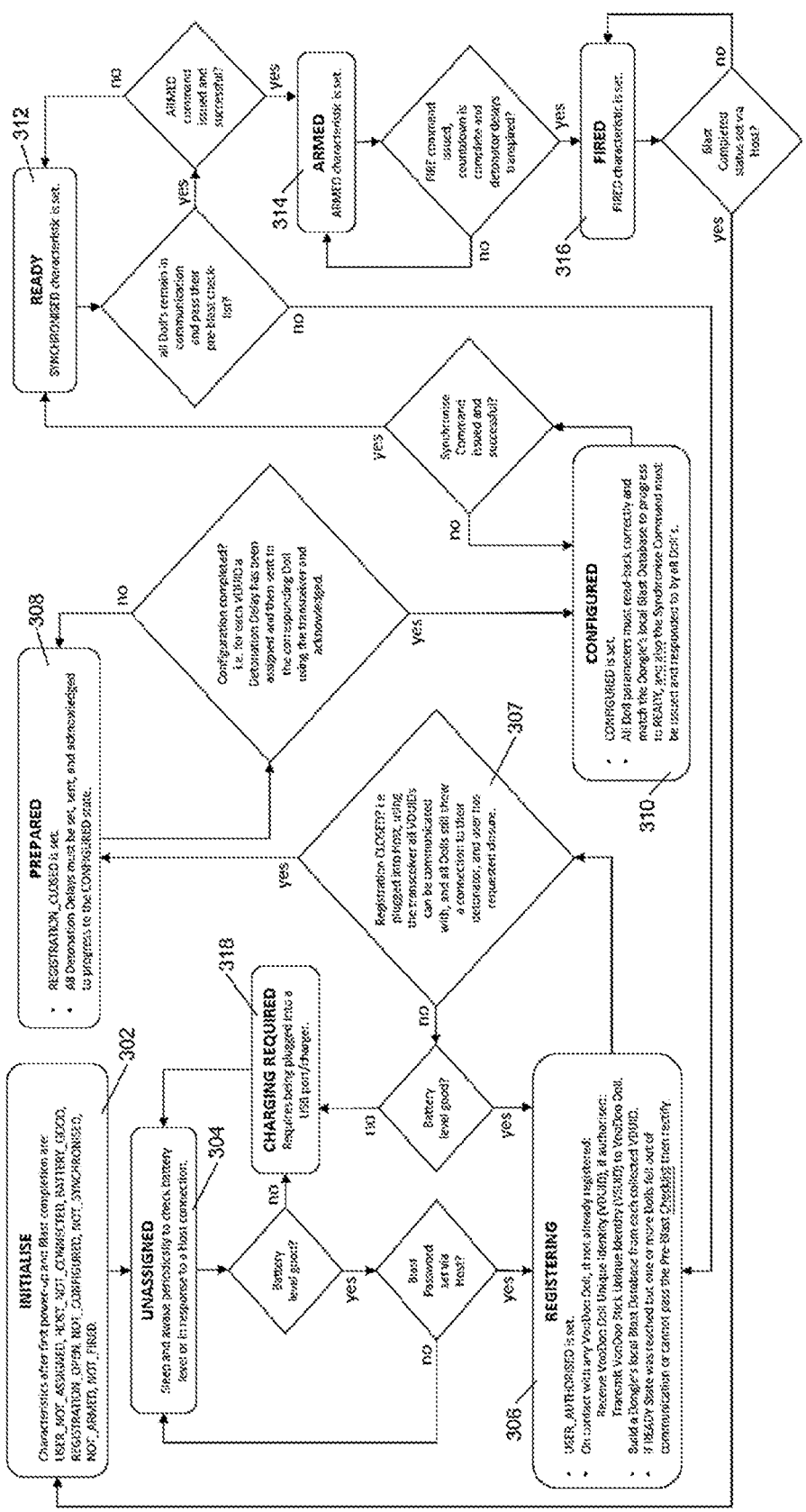
FIG. 3 illustrates a state change flow chart for a dongle of the system of FIG. 1.

An embodiment of the general dongle system states, which are readable by the Host Application 181, is detailed below and a flowchart of the various states can be seen in FIG. 3:

| STATE | DESCRIPTION |
| --- | --- |
| INITIALISE 302 | The state at power-up and after a blast is designated as completed or cancelled by the Operator. All properties are set to their initial inert value. |
| UNASSIGNED 304 | The Dongle 100 is not yet designated for use on a blast. This is a low-power state where the Dongle 100 mainly sleeps to conserve battery charge and wakes up periodically to check its battery level or in response to a Host Connection. |
| REGISTERING 306 | The Dongle 100 has been authorised via the Host Application 181 for use on a blast and authorities have been assigned. It can now be used away from the Host Computer 180 to register Trigger devices via the contact electrodes, building the local Blast Database 181a one VSUID at a time. The Operator has not completed the task or building the database. |
| PREPARED 308 | The Blast database 181a has been closed and the participating Trigger devices 140 are now nominally defined. The Host Application 181 can be used to set Detonation Delays 187. |
| CONFIGURED 310 | All Detonation Delays 187 have been set and every visible Trigger device 140 over radio communication is explicitly included in the blast and registered, or explicitly excluded. |
| READY 312 | All participating Trigger integrity criteria have been met - such as battery level, Detonator 141 connection, reliable radio communication etc. The synchronisation operation has been performed successfully for all Trigger devices 140. |
| ARMED 314 | Each Trigger device 140 has charged up its Charge Storage Capacitor 147 and nominally ready for firing. |
| FIRED 316 | The countdown has expired after Operator initiation and all Trigger devices 140 have been commanded to fire and their individual Detonation Delays 187 have transpired. |
| CHARGING REQUIRED 318 | The battery level of the Dongle 100 is critically low and therefore the assignment process and REGISTERING state are both inhibited until the battery level reaches a sufficient level. |

In some embodiments, the dongle system has properties changed in response to Host Application 181 actions, events, and in response to state transitions as follows:

| STATUS PROPERTY | VALUES |
| --- | --- |
| BLAST_ASSIGNMENT | USER_NOT_ASSIGNED, USER_ASSIGNED |
| HOST_CONNECTION | HOST_NOT_CONNECTED, HOST_CONNECTED |
| BATTERY_LEVEL | BATTERY_CRITICAL, BATTERY_MARGINAL, BATTERY_GOOD |
| REGISTRATION | REGISTRATION_OPEN, REGISTRATION_CLOSED |
| BLAST_CONFIGURATION | NOT_CONFIGURED, CONFIGURED |
| SYNCHRONISATION | NOT_SYNCHRONISED, SYNCHRONISED |
| ARMING | NOT_ARMED, ARMING, ARMED |
| FIRING | NOT_FIRED, FIRING, FIRED |

Figure 4:
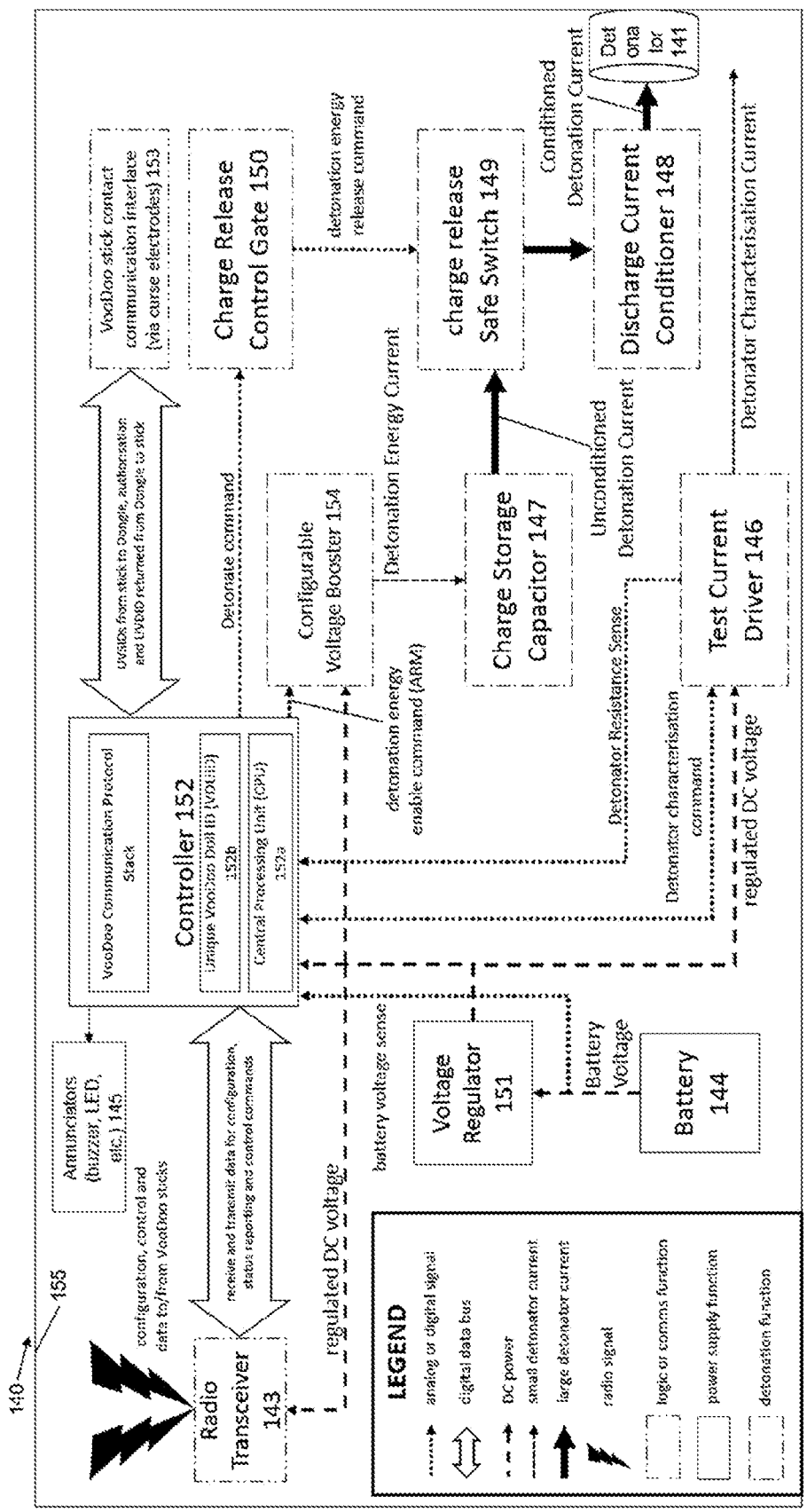
FIG. 4 illustrates a block diagram of a trigger device of the system of FIG. 1 according to an embodiment of the present invention.

Turning now to FIG. 4 there is illustrated a function block diagram of the trigger device 140. Each trigger device 140 includes a wireless radio transceiver 143 which provides communication with the dongle 100 to allow the trigger device 140 to receive commands and issue updates regarding the status of the trigger device 140, including any error reports.

The trigger device 140 also includes an internally located non-rechargeable battery 144 (although the battery could be rechargeable in some embodiments), and annunciators 145 for providing visual, audio and haptic feedback. Each trigger device 140 comprises a safe trigger system 140a including a test current generator 146, an electric energy storage unit in the form of a charge storage capacitor 147, a detonation current conditioning system 148, a high-speed solid-state switch 149, a safety mechanism 150, a voltage regulator 151 which is a part of an internal power supply, a controller 152 and a contact communication interface in the form of contact electrodes 153. Furthermore, the trigger device includes a configurable voltage booster 154. Similar to the dongle 100, each of the components above are arranged within a housing 155. The contact communication terminal of the trigger device may be substituted with a contactless or close-proximity communication terminal, such as a Near Field Communication (NFC) terminal or Radio Frequency Identifier (RFID) terminal, for example.

The battery 144 is used to power the trigger device and supply electrical charge to the detonator 141 for detonation when required. The battery 144 is connected to and provides power to the voltage regulator 151 which is in turn connected to the controller 152 and the radio transceiver 143.

The annunciators 145, as described above in relation to the dongle 100, confirm particular events or states (e.g. successful trigger device 140 registration to the dongle 100 via the electrodes 153, 107) through visual, haptic and/or audio feedback, and are controlled by the controller 152. The annunciators 145 may take the form of any appropriate audio and/or visual feedback device, such as a vibration motor, buzzer and/or light emitting diode, for example.

The test current generator 146 assesses that an associated detonator 141 is correctly connected, and also provides a means to measure its resistance so that an appropriate detonation voltage is generated.

The charge storage capacitor 147 stores the detonation current once arming occurs.

The detonation current conditioning system 148 maintains detonation current above a lower limit to ensure rapid detonation but below an upper limit to ensure proper detonation function.

The high-speed solid-state switch 149, which is controlled by the safety mechanism 150 (i.e. the trigger mechanism), releases the stored electrical charge into the detonator 141 when firing.

The safety mechanism 150 ensures that arming and subsequently the detonation charge is only released once the system has met specific criteria to ensure no false detonation occurs.

The controller 152 manages all functions and controls state flow of the trigger device 140 through a central processing unit 152a. As can be seen in FIG. 3, the controller 152 also includes a globally unique identifier (referred to in the present embodiment as a VooDoo Doll (Trigger device) Unique ID—VDUID 152b) which provides a secure communication link with a specific Dongle 100 for both 1-1 Dongle-Trigger Device signals and 1-many broadcast Dongle-Trigger Device signals.

Finally, the contact electrodes 153 facilitate contact communication with a dongle 100 (also having contact electrodes 107) for registration and authorisation to the dongle 100.

Figure 5:
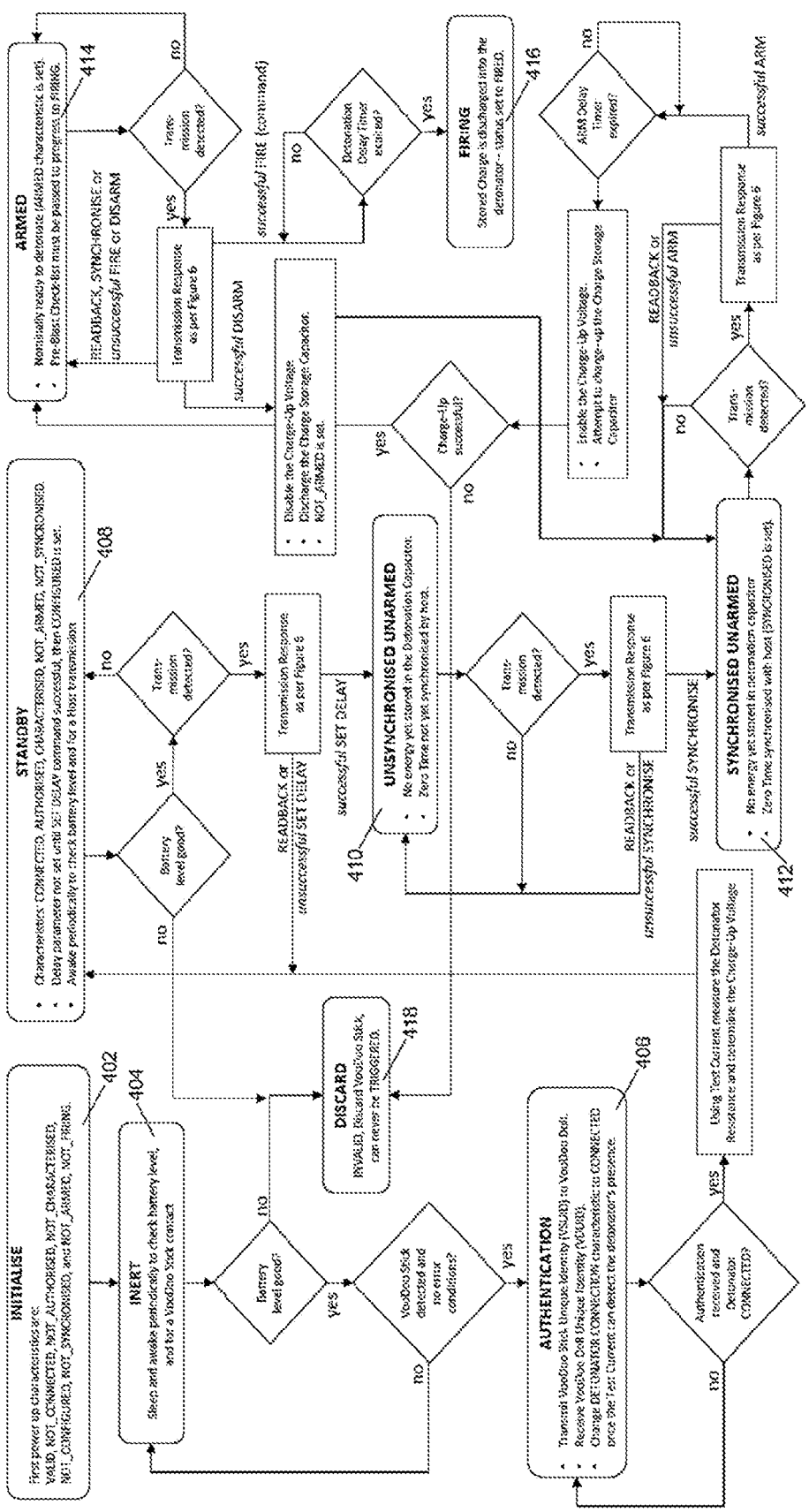
FIG. 5 illustrates a state change flow chart for a trigger device of the system of FIG. 1.

In an example, the general trigger device system states, which are readable by the Host Application 181 via the dongle 100, detailed below and a flowchart of the various states can be seen in FIG. 5:

| STATE | DESCRIPTION |
|---|---|
| INITIALISE 402 | The state at power-up. All properties are set to their initial inert value. |
| INERT 404 | The Trigger device 140 is not yet connected to a Detonator 141, or is not yet designated for use on a blast, or has a rectifiable error condition preventing it from being authorised (i.e. INVALID). This is a low-power state where the Trigger device 140 mainly sleeps to conserve battery current and wakes up periodically to check its battery level, assess its Detonator 141 connection status, or in response to the contact electrodes 153 being contacted by a Dongle 100. |
| AUTHENTICATION 406 | A Dongle 100 has been authorised via the Host Application 181 for use on a blast and authorities have been assigned. The assigned Dongle 100 has just contacted this Trigger device's 140 contact electrodes 153 and requested the VDUID, and once provided the Dongle 100 transmits back its own VSUID and this constitutes and authorisation to this Trigger device 140 to participate in this blast and thus progress to follow-on states. This exchange has been permitted because the Trigger device 140 has no error conditions preventing it from controlling detonation, otherwise authentication fails and the Trigger device 140 progressed to DISCARD if its battery level was critical and otherwise remains in the INERT state for rectifiable error conditions. |
| STANDBY 408 | Awaiting assignment of a Detonation Delay 187 and can only stay in this state provided that the battery level remains functional. |
| UNSYNCHRONISED UNARMED 410 | The Detonation Delay 187 has been set by the Operator via the Host Application 181 but the Zero Time remains unknown. No charge has yet been accumulated for firing. |
| SYNCHRONISED UNARMED 412 | The Zero time has been set and this Trigger device 140 is now time synchronised to the local clocks of other Trigger devices 140. No charge has yet been accumulated for firing. |
| ARMED 414 | The Charge Storage Capacitor 147 has been charged up after receipt of the ARM command from the Operator and after a safety timer has expired. |
| FIRING 416 | The FIRE command has been received from the Operator and the Detonation Delay 187 is waited out followed by the Charge Release Switch enabling the sored electrical energy to be released into the Detonator 141. |
| DISCARD 418 | The battery level of the Trigger device 140 is too low and therefore it cannot be relied upon to maintain communication or supply sufficient charge for a blast. It must be discarded and not used. |

Furthermore, the trigger device system has properties changed in response to Host Application 181 actions, events, and in response to state transitions as follows:

| STATUS PROPERTY | VALUES |
| --- | --- |
| VALIDITY | INVALID, VALID |
| DETONATOR_CONNECTION | NOT_CONNECTED, CONNECTED |
| BATTERY_LEVEL | BATTERY CRITICAL, BATTERY_MARGINAL, BATTERY_GOOD |
| AUTHORISATION | NOT_AUTHORISED, AUTHORISED |
| DELAY_CONFIGURATION | NOT_CONFIGURED, CONFIGURED |
| SYNCHRONISATION | NOT_SYNCHRONISED, SYNCHRONISED |
| ARMING | NOT_ARMED, ARMING, ARMED |
| FIRING | NOT_FIRING, FIRING, FIRED |

With reference to both the dongle 100 and the trigger device 140, initial pairing/associating and registration between the two devices 100, 140 occurs via the respective contact electrodes 107, 153 only for the purpose of establishing an authorised association between a specific dongle to be used for the blast operation and the relevant registered trigger devices, and as part of this, to exchange respective unique identifiers 106c, 152b. Physical, surface-to-surface contact is required between the electrodes 107, 153 of the dongle 100 and the trigger device 140 for pairing/associating and registration to occur. From this point all communication is conducted wirelessly whereby the dongle 100 serves the purpose of providing a wireless means of communication between the Host Application 181 and the detonator trigger devices 140 (i.e. acting as a conduit between the computer 180 hosting the host application 181 and the trigger devices 140).

It should be appreciated that the topology of the network established between the host computer 180 and the trigger devices 140 can be either a hub-spoke topology (Host is the hub and trigger device communication paths are the spokes) or a mesh topology. For the Hub topology, some trigger devices may be assigned to communicate as a wireless repeater to/from other trigger devices in order to extend radio range or enhance the robustness of the radio link.

In use, a blast site is prepared by connecting one trigger device 140 to a detonator 141, as shown in FIG. 1. No external or central power supply is necessary as each trigger device 140 houses its own battery 144 which is used to power it for all operations including supplying the current surge for the detonation. To ensure that false triggering cannot occur a strict series of qualification criteria must be met before any detonator can be triggered and an inherently safe electrical charge management system is used.

Firstly, a dongle 100 is authorised for use by the blast operator via the Host Application 181 installed on the host computer 180 and from that point only this specific dongle 100 can be used for the planned blast.

Working around the site one-by-one, each trigger device 140 must be physically touched by the authorised dongle 100 on its contact communication interface (i.e. the electrodes 153), wherein the dongle 100 and the trigger device 140 exchange their respective globally unique identities 106c, 152b. In this operation, once the dongle 100 receives a specific VooDoo Doll Unique ID (VDUID) 152b, the action is reciprocated by the dongle 100 supplying its own Voodoo Stick Dongle Unique ID (VSUID) 106c to the trigger device 140 that was most recently touched. This associates and registers the dongle 100 with the specific trigger device 140 and the trigger device 140 is then registered/paired to the dongle 100 and has met the condition for detonation control. This associating operation allows the trigger device 140 to now communicate exclusively with the dongle using their respective wireless transceivers. When a registration of the two devices 100, 140 is attempted the trigger device 140 also automatically verifies its own detonator connection using a small test current generated by the test current generator 146.

As the dongle 100 is used to register each trigger device 140, the dongle 100 internally builds the blast database 106b which consists simply of the list of the VDUIDs 152b from the various trigger devices 140. This step is shown at 303 of the flow chart 300. Aural, visual and/or haptic feedback via a buzzer, lights or a vibrating mechanism in both the trigger device 140 and the dongle 100 is used to confirm that the registration operation was successful. In some embodiments, if the registration is unable to be completed, the trigger device 140 will indicate that a fault condition is present.

Once all the trigger devices have been registered the blast Operator then brings the dongle back to the host computer 180 and plugs it into a USB port 188.

Figure 7:
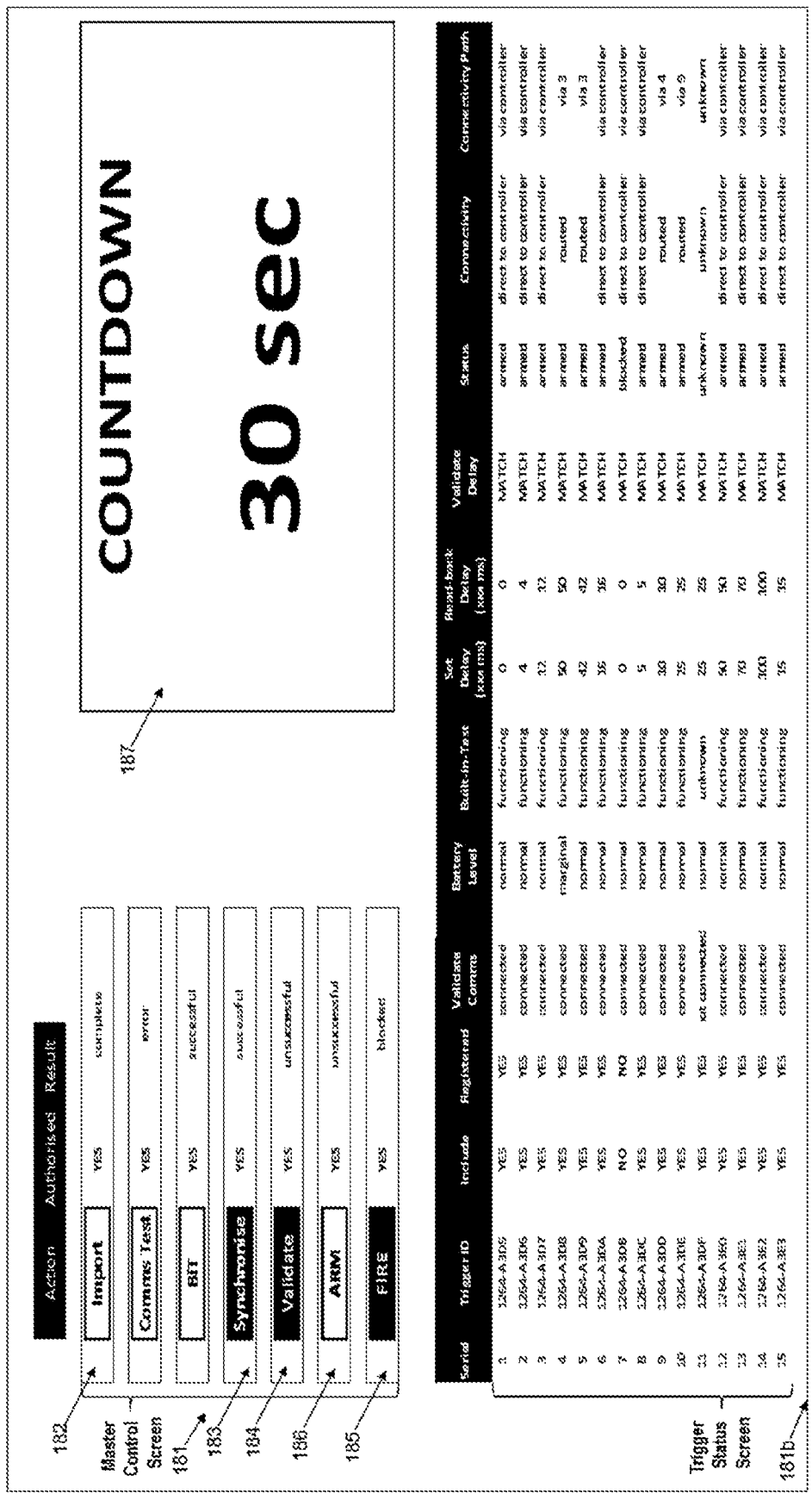
FIG. 7 illustrates an embodiment of a graphical user interface of the host computer of the system of FIG. 1.

An embodiment of the user interface 181b of the host application 181 as it appears on a host computer 180 having the host application 181 installed thereon is shown in FIG. 7. Through the embodied interface and host application 181, an operator can set control authorities and passwords for an operator and a specific dongle, visualise the content of the Blast Database including:

a. Registered VooDoo Doll identities (VDUIDs)—read only,
b. Unregistered VooDoo Doll identities (VDUIDs)—read only,
c. The trigger device health status including battery and Detonator connection—read only,
d. Detonation Delays 187—writable, and include or exclude any trigger device 140 from a blast set-up, and control synchronisation, arming, disarming, and firing.

The Import Function 182 of the host application 181 is used to transfer the blast database 106b from a connected dongle 100 memory into the memory of the local Host computer 180 and database 181a. The host application 181 then identifies each trigger device 140 within radio range (as determined by the radio transceiver 101 of the dongle 100) and determines any discrepancies with the blast database. One example of a discrepancy includes the situation where a trigger device 140 is identified in the blast database 106b but is not within range of the radio transceiver 101 of the dongle 100. If a discrepancy is identified, the host application 181 will alert the operator who can take the appropriate steps to address the discrepancy.

Once the blast database 106b in the host application 181 is consistent with all of the trigger devices 140 seen via radio communication then the operator can assign the database property "CLOSED" (as shown at step 307 of FIG. 3) and the system assumes a status of "PREPARED" 308.

Moving to a blast configuration step, each trigger device 140, via radio communication, is assigned its own Detonation Delay 187 in increments of milliseconds (however this could be any time unit) from zero to the maximum delay possible (which is operator defined). In some embodiments, every trigger device 140 must be assigned a delay, which may be zero, and the user then reads back the delays stored in the trigger devices 140. If the delays match the host application 181 settings and no other fault conditions have developed in the trigger devices 140 then the blast set-up state is now deemed "CONFIGURED" 310.

In order to synchronise the dongle and the relevant trigger devices, via the Host Application 181, the Operator issues the "SYNCHRONISE" command 183 through host application 181 and each trigger device 140 nominally sets its respective local timing to the instant the signal is received, this is known as "Zero Time". The operator can validate and check the synchronisation status of each trigger device 140 at any time using the "VALIDATE" command 184.

To update the Zero Time the operator can also reissue the SYNCHRONISE command 183 at any time before the "FIRE" Command 185 is issued—this may be done if the blast site has been left for a long period of time before firing in order to maintain the most accurate preservation of the relative Detonation Delay 187 between trigger devices 140 given that their internal timing clocks inevitably experience some long term drift.

Once the synchronisation is performed the system including the connected dongle 100 and host computer 180 enters the "READY" 312 and periodically communicates with all the trigger devices 140 to ensure that system integrity is present. Any loss of communication or fault developing in a trigger device 140 will force the system nominally back to the REGISTERING state 306, from which it will automatically progress through to the PREPARED 308 and CONFIGURED 310 states depending upon the nature of the discrepancy identified. For example, if communication is lost then it will not progress past REGISTERING 306 until the operator rectifies the fault. If, however, the fault pertains to a trigger device 140 not showing that it has been synchronised then the system will wait in the CONFIGURED state 310 until the operator reattempts the synchronise operation.

At the arming step, via the Host Application 181 the Operator broadcasts the "ARM" command 186, and after an imposed safety delay of several seconds, each trigger device 140 energises its respective internal Charge Storage Capacitor 147 and registers a fault condition internally if this is not successful. This operation is nominally performed just before firing is going to take place.

Before the "FIRE" command 185 can be issued the Operator must issue the "VALIDATE" command 184. When this command 184 is issued the Host Application 181 contacts each trigger device 140 in succession to make a final verification and evaluation of one or more of the following:

functional radio communication,
functional electrical connection to the Detonator 141,
the absence of general internal faults in the Trigger device 140,
that the assigned Detonation Delay 187 has been read back and matched to what is assigned in the Host Application 181,
that the Synchronisation signal was received, and
that Arming was successful and a detonation charge is ready to release into the detonator 141.

If all of the above criteria are met then the FIRE command 185 can be issued once the Operator sets a countdown period in the Host Application 181.

Alternatively, disarming can be performed via the Host Application 181 the Operator can elect to issue a "DISARM" command to render the blast site inert. This will slowly and safely discharge the Charge Storage Capacitor 147 of each Trigger device 140 into an internal dummy load. This operation is useful if firing is to be delayed until a later time or if there are faults to rectify and staff will be re-entering the vicinity of detonators.

If this operation is used, then once firing is going to subsequently take place, the system should again be synchronised, armed, and validated.

Finally, in the firing step, using the Host Application 181, the operator broadcasts the "FIRE" command 185 which is transmitted to each trigger device 140 instantly once the countdown expires. Once each trigger device 140 receives the FIRE command 185 it awaits its assigned Detonation Delay 187 before releasing the stored electrical charge into the Detonator 141. In the illustrated embodiment, the detonation delay 187 is set to 30 seconds. However, as described throughout, the delay can be anywhere in the range of zero seconds to a user/operator defined maximum delay time.

Once the blast has occurred the state assumed is "FIRED" 316 and the operator can subsequently instruct the host application 181 to "COMPLETE BLAST" wherein the system reinitialises.

Figure 6:
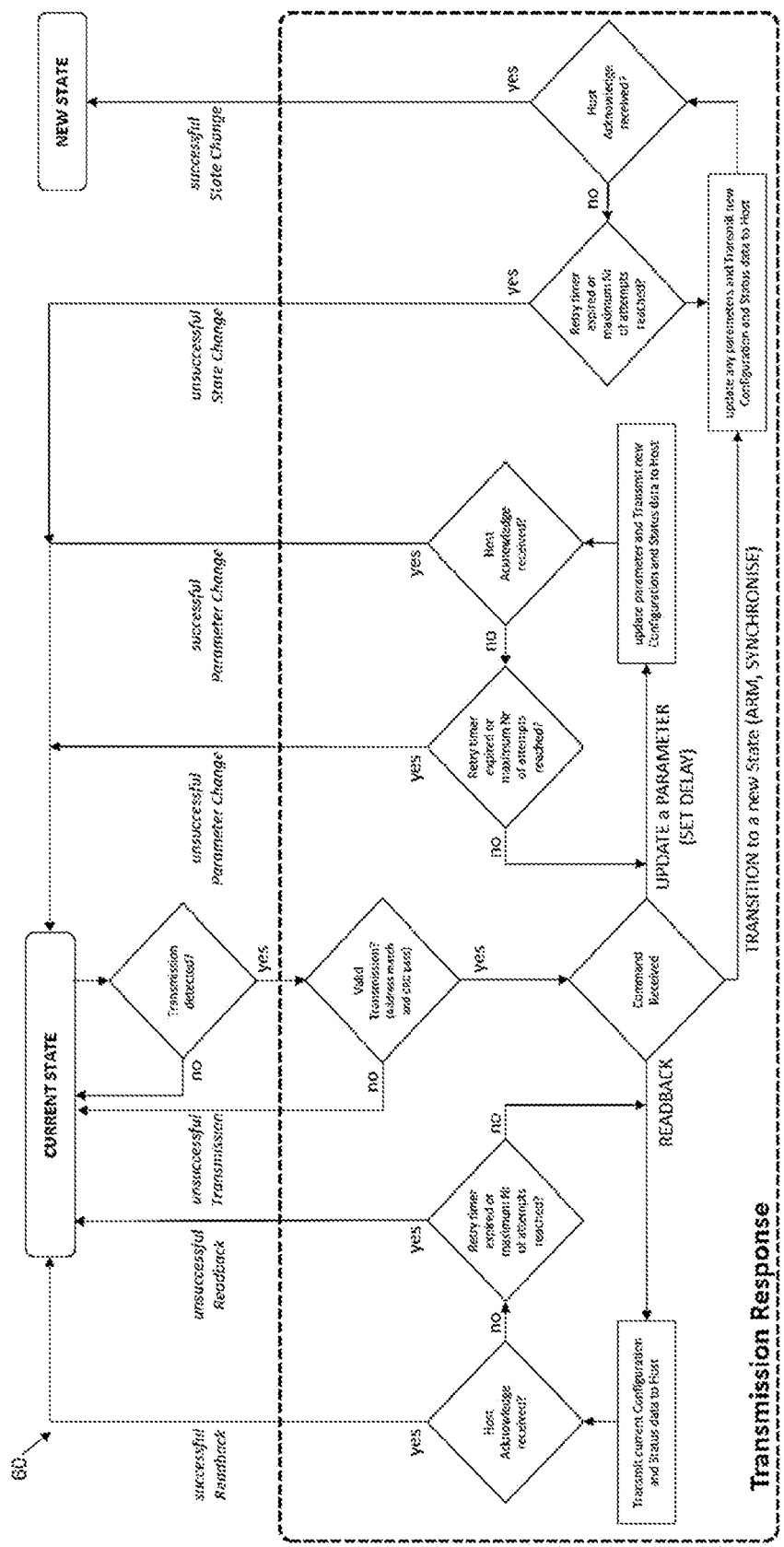
FIG. 6 illustrates a transmission response flow chart for communications between the dongle and the trigger device.

With reference to FIG. 6, a flowchart 60 showing transmission response for a trigger device back to a dongle 100 relating to changes in state based on certain commands sent and received can be seen.

Embodiments of the wireless detonation system described here enable blast sites to be set-up with accurate delays, checked, and fired without the need for wires interconnecting the detonators and without the need for the operator to use a common central power supply. Only instantaneously firing "dumb" detonators are required. The system allows for more reliable and rapid blasting and is intended to significantly lower the cost and time required to set up a blast site and increase the assurance of a successful blast.

In some embodiments, the principles of authorisation and participation whereby the globally unique identifiers are used, ensure control and operation by only a designated dongle, and thus by extension a designated Operator and a single host computer/application at any one time. This improves the safety of the system relative to existing systems and reduces and/or eliminates unintended detonation occurring.

Furthermore, embodiments of the system provide selective inclusion or exclusion of trigger devices and their detonators in a blast to control blasting sequences.

As described throughout the specification, the multi-level stage-gate design of the dongle state flow ensures integrity of both the dongle and the trigger devices participating in a blast. Each state can only be entered once a strict set of criteria has been met and any subsequently identified discrepancies force the dongle state back to a safe earlier stage commensurate with the observed discrepancy so that it can be safely resolved before blasting occurs.

Further to the above, the multi-level stage-gate safe trigger mechanism used in the trigger devices prevents detonation unless a strict sequence of events has occurred—i.e. power-up and settle recognised by the separate trigger, authorisation recognised in the firmware, followed by arming recognised by the separate trigger, and also the satisfaction of other system health criteria including reliable radio communication and battery level recognised in the firmware and monitored by the host application on the remote host computer.

Advantageously, the physical isolation between the detonation charge release mechanism (trigger) and the core control component (controller) ensures that software bugs cannot cause a false trigger. In some embodiments, a separate logic gate and switch component are employed to effect triggering.

The inherent inability of the battery to discharge the detonator because of its low voltage, and hence the guarantee that unauthorised detonation cannot occur due to unforeseen events or manufacturing faults. Hence, the use of accumulated charge on a capacitor bank, only at the arming stage and verified my internal measurement and the success of which is reported to the Host Application.

Furthermore, a voltage booster advantageously exploits the principle that stored energy rises with the square of voltage applied to the capacitor is used to overcome the battery's instantaneous inability to supply detonation current and only enabled when arming occurs.

Further advantageously, the system provides full control and visibility of each of the trigger devices and detonators by means of the host application with wireless connectivity to the trigger devices via the Dongle.

The system averts the logistic and physical effort required to link detonators by wires and to a power supply. In addition, this relieves the operator of any need to calculate the necessary voltages and currents which is handled by the host application.

Further embodiments of the system lower the likelihood of improper detonator connection by the trigger device by automatically testing the connection and reporting it to the operator through the host application installed on the host computer, and furthermore, preventing operation until any issues are rectified.

Embodiments of the invention which provides tactile or aural feedback through annunciators conveniently provide rapid, natural, and unambiguous confirmation of a successful association operation of a dongle with a trigger device to an operator.

Finally, the configurability and reconfigurability of detonation delays by making them programmable via the host application reduces the need to stock detonators with differing delays.

Throughout the specification, various wireless devices are referenced and employed in the context of the embodiments of the present invention. However, it will be understood that any radio frequency or optical wireless standard could be utilised. In some examples, these standards can include, but are not limited to Bluetooth (and any of its variants), 802.11 WiFi (and any of its variants including WiFi Direct) and 802.15.4. In addition, any licensed or unlicensed radio frequency band could be utilised, including the 2.4 GHz ISM band, the 868 MHz band or the 915 MHz band, for example.

Reference to a dongle throughout the specification refers to a portable or handheld communication and processing assembly.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step, etc.

The above detailed description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

Throughout the specification and claims (if present), unless the context requires otherwise, the term "substantially" or "about" will be understood to not be limited to the specific value or range qualified by the terms.

What is claimed is:

1. A wireless detonation system comprising:
    a dongle for removable connection with a computer system and for wirelessly communicating with and controlling one or more trigger devices, the dongle comprising:
    a dongle processor programmed to communicate with the computer system via a communication interface to operate a radio transceiver to wirelessly communicate with one or more trigger devices;
    a radio transceiver coupled to the dongle processor;
    a communication interface coupled to the dongle processor; and
    one or more communication terminals in communication with the dongle processor, wherein the one or more communication terminals of the dongle comprise one or more close proximity communication terminals and/or one or more contact communication terminals; and
    a trigger device for wirelessly communicating with the dongle, the trigger device comprising:
    a trigger device processor programmed to communicate with the dongle; a radio transceiver in communication with the trigger device processor;
    one or more communication terminals in communication with the trigger device processor, wherein one or more communication terminals of the trigger device comprise one or more contact communication terminals and/or one or more close proximity communication terminals; and
    an electric energy storage unit under control of the trigger device processor and adapted to store electrical energy for igniting a detonator,
    wherein in response to the one or more communication terminals of the dongle communicating with the one or more communication terminals of the trigger device, the dongle is programmed to transmit a unique dongle identifier to the trigger device, and the trigger device is programmed to transmit a unique trigger device identifier to the dongle, wherein the trigger device is thereby synchronized to the dongle and is adapted to only accept commands from the dongle, wherein the dongle processor is further programmed to receive commands from a connected computer system and wirelessly transmit the commands to the trigger device and wherein the trigger device processor is further programmed to, in response to the commands from the dongle, ignite a detonator connected to an explosive charge by charging the electric energy storage unit and subsequently discharging the electric energy storage unit to detonate the explosive charge.

2. The wireless detonation system according to claim 1, wherein the system comprises one or more trigger devices and a detonator connected to each trigger device and configured to be activated or ignited by the electric energy storage unit.

3. The wireless detonation system according to claim 1, wherein the dongle further comprises a database stored on the dongle in communication with the dongle processor, wherein the database stores the unique trigger device identifier associated with each trigger device.

4. The wireless detonation system according to claim 1, wherein the dongle processor has the unique dongle identifier stored thereon.

5. The wireless detonation system according to claim 1, wherein each of the trigger device and the dongle comprise a battery.

6. The wireless detonation system according to claim 1, wherein the electric energy storage unit comprises a capacitor.

7. The wireless detonation system according to claim 1, wherein the dongle further comprises one or more annunciators for providing visual and/or haptic feedback and wherein each annunciator is at least one of a vibration motor, a light emitting diode, a buzzer, or a speaker, and wherein each annunciator of the dongles is in communication with and is controlled by the dongle processor.

8. The wireless detonation system according to claim 1, wherein each trigger device further comprises one or more annunciators for providing visual and/or haptic feedback, and wherein the annunciators are at least one of a vibration motor, a light emitting diode, a buzzer, or a speaker.

9. The wireless detonation system according to claim 7, wherein each annunciator of the trigger devices is in communication with and is controlled by a corresponding trigger device processor.

10. The wireless detonation system according to claim 1, wherein the system further comprises a computer system having a software application installed thereon adapted to control the dongle and the trigger device, the computer system is programmed to communicate with each trigger device via the dongle, wherein the dongle is a conduit between each trigger device and the computer system, and wherein the computer system is located remotely from each trigger device located around a blast site.

11. The wireless detonation system according to claim 1, wherein the one or more contact communication terminals of the dongle comprise one or more electrodes and the one or more communication terminals of the trigger device comprise one or more electrodes.

12. The wireless detonation system according to claim 1, wherein the communication terminals of the trigger device and the dongle comprise a Near Field Communication (NFC) terminal or a Radio Frequency Identifier (RFID) terminal.

13. The wireless detonation system according to claim 1, wherein the trigger device further comprises a voltage booster connected to the electric energy storage unit.

14. A method for controlling detonation of one or more explosive charges, the method comprising:
wirelessly associating one or more trigger devices with a dongle, wherein each trigger device is connected to a detonator connected to an explosive charge, wherein the dongle is associated with each trigger device through communication by contact or close proximity via communication terminals of each of the dongle and the trigger device, wherein in response to the communication terminals of the dongle communicating with the communication terminals of the trigger device, the dongle is programmed to transmit a unique dongle identifier to the trigger device, and the trigger device is programmed to transmit a unique trigger device identifier to the dongle, wherein each trigger device is thereby synchronized to the dongle and is adapted to only accept commands from the dongle;
connecting the dongle to a computer system having a control application installed thereon;
wirelessly transmitting a first command generated by the control application from the dongle to at least one of the one or more trigger devices to arm the at least one of the one or more trigger devices;
charging an electric energy storage unit of the at least one of the one or more trigger devices in response to receiving the first command to arm the at least one of the one or more trigger devices, wherein each electric energy storage unit is connected to a corresponding detonator;
wirelessly transmitting a second command generated by the control application from the dongle to the at least one of the one or more trigger devices to detonate the explosive charge; and
discharging each electric energy storage unit to ignite the corresponding detonator in response to receiving the second command to detonate a corresponding explosive charge.

15. The method according to claim 14, wherein the method further comprising:
drilling a blast hole in a blasting face; and
locating a trigger device connected to a detonator and an explosive charge within the blast hole.

16. The method according to claim 14, wherein the method further comprises wirelessly transmitting a third command from the dongle to the at least one of the one or more trigger devices to evaluate the at least one of the one or more trigger devices, and wherein the third command is transmitted before the first command and before the second command.

17. The method according to claim 16, wherein discharging the electric energy storage unit cannot be actioned until the third command has been received.

18. The method according to claim 14, wherein the method further comprises evaluating one or more conditions or states of the at least one of the one or more trigger devices, and wherein the evaluation comprises evaluating an electrical connection between the electric energy storage unit and the detonator of the at least one of the one or more trigger devices.

19. The method according to claim 14, wherein the method further comprises physically contacting one or more contact communication terminals of the dongle with the communication terminals of each of the one or more trigger devices to thereby wirelessly associate the dongle with each of the one or more trigger devices.

20. The method according to claim 14, wherein in response to receiving the second command and before discharging the electric energy storage unit, the method further comprises boosting a voltage of a charge of the electric energy storage unit via a voltage booster of each trigger device.

* * * * *